(12) United States Patent
Tang et al.

(10) Patent No.: US 11,978,150 B2
(45) Date of Patent: May 7, 2024

(54) THREE-DIMENSIONAL MODEL AND MATERIAL MERGING METHOD, DEVICE, TERMINAL, STORAGE MEDIUM AND RENDERING METHOD

(71) Applicant: HANGZHOU QUNHE INFORMATION TECHNOLOGY CO., LTD., Hangzhou (CN)

(72) Inventors: Rui Tang, Hangzhou (CN); Hailin Zhang, Hangzhou (CN); Li Chen, Hangzhou (CN); Ke Ma, Hangzhou (CN)

(73) Assignee: HANGZHOU QUNHE INFORMATION TECHNOLOGY CO., LTD., Hangzhou (CN)

( * ) Notice: Subject to any disclaimer, the term of this patent is extended or adjusted under 35 U.S.C. 154(b) by 114 days.

(21) Appl. No.: 17/630,890

(22) PCT Filed: Jun. 5, 2020

(86) PCT No.: PCT/CN2020/094758
§ 371 (c)(1),
(2) Date: Jan. 27, 2022

(87) PCT Pub. No.: WO2021/098189
PCT Pub. Date: May 27, 2021

(65) Prior Publication Data
US 2022/0319095 A1    Oct. 6, 2022

(30) Foreign Application Priority Data
Nov. 18, 2019 (CN) .......................... 201911128574.6

(51) Int. Cl.
G06T 15/04 (2011.01)
G06T 19/20 (2011.01)

(52) U.S. Cl.
CPC .............. *G06T 15/04* (2013.01); *G06T 19/20* (2013.01); *G06T 2219/2012* (2013.01)

(58) Field of Classification Search
CPC . G06T 15/04; G06T 19/20; G06T 2219/2012; G06T 15/005; G06T 3/4038;
(Continued)

(56) References Cited

U.S. PATENT DOCUMENTS

2015/0035830 A1    2/2015 Zhang
2020/0082594 A1*   3/2020 Stevenson ............... G06T 19/20
2021/0362061 A1*   11/2021 Cai ......................... A63F 13/60

FOREIGN PATENT DOCUMENTS

CN    107103638    8/2017
CN    107204029    9/2017
(Continued)

OTHER PUBLICATIONS

International Preliminary Report on Patentability Chapter I Form 373 5 pages and English Translation of International Preliminary Report on Patentability Chapter I Form 373 5 pages for PCT/CN2020/094758, dated May 17, 2022, Original and English translation, 10 pages. (Year: 2022).*

*Primary Examiner* — Jeffery A Brier
(74) *Attorney, Agent, or Firm* — Jiwen Chen; Joywin IP Law PLLC

(57) ABSTRACT

The present invention discloses a three-dimensional model and material merging method, device, terminal, storage medium, and rendering method, which belongs to the technical field of graphic rendering. The method comprises obtaining three-dimensional model files, material files and texture maps; determining the layout of the texture map; de-duplicating the material, merging the texture map of each channel according to the determined texture layout to obtain the texture map puzzle of each channel; optimizing the storage size of the three-dimensional models and texture (Continued)

map puzzles of each channel to generate and store the configuration file. The present method improves the speed of three-dimensional model and material merging, reduces the amount of data storage, thereby reduces the amount of data loading of the rendering CPU, and thus improves the rendering efficiency.

15 Claims, 4 Drawing Sheets

(58) Field of Classification Search
CPC ............... G06T 19/006; G06T 2200/32; G06T 2219/2016; Y02P 90/30
See application file for complete search history.

(56) References Cited

FOREIGN PATENT DOCUMENTS

| | | | | |
|---|---|---|---|---|
| CN | 109603155 | | 4/2019 | |
| CN | 109603155 A | * | 4/2019 | ............. A63F 13/60 |
| CN | 109671158 | | 4/2019 | |

* cited by examiner

THREE-DIMENSIONAL MODEL AND MATERIAL MERGING METHOD, DEVICE, TERMINAL, STORAGE MEDIUM AND RENDERING METHOD

This is a U.S. national stage application of PCT Application No. PCT/CN2020/094758 under 35 U.S.C. 371, filed Jun. 5, 2020 in Chinese, claiming priority to Chinese Patent Applications No. 201911128574.6 filed Nov. 18, 2019, all of which are hereby incorporated by reference.

TECHNICAL FIELD

The present invention belongs to the field of image rendering technique, and specifically relates to a three-dimensional model and material merging method, device, terminal, storage medium, and rendering method.

BACKGROUND TECHNOLOGY

Multi-models and materials merging technology refers to the technology of merging the BaseColor channel maps of the material into one or several images, and merging multiple models into one model or several models according to the UV of the model and the characteristics of the material. For some special cases, such as models with transparent material, merging is not conducted; if the UV of the model is much larger than the range of [0, 1] or the amount of data increases infinitely, in order to make the map clear, the merging is also not conducted. This technology is mainly used in the real-time rendering field, so the texture map needs to output Metallic, Specular, Roughness, Normal, Emissive and other channel information at the same time. At present, there are three main ways to implement this technology, including:

The first method is mainly used in the game industry. Artists merge multiple models when making models, and at the same time unfold the UV manually or semi-automatically to adjust to a reasonable position. The texture of the material is drawn based on the UV. The advantage of this method is that the UV distribution is reasonable, the local integrity of the texture is strong, the material can be replaced locally, the black edge is not easy to occur, and the effect is presented in the best way. However, the disadvantage is that it cannot support producing in batches so the labor cost is relatively high.

The second method is to merge multiple models and materials using topological approach, that is, according to the texture UVs of multiple models, select the relevant tools for UV expansion, map the UVs of the multiple models to the UVs of the merged model, and then bake the material maps corresponding to the multiple models into the material maps corresponding to the merged model. The advantages of this method are that it supports producing in batches; the effect is close to that of the first method. The disadvantages are that the UV spreading is scattered; black border occurs, causing Normal problems to the model; local material replacement cannot be performed; for complex models, UV spreading and the cost of baking time for texture maps is relatively high.

The third method is to merge multiple models and materials based on Texture Atlases. This method arranges the textures used by the materials on a picture in a certain way, and then adjusts the UV position of the model according to the position of the texture to merge the models. At present, this technology is used in the Actor Merging of the real-time rendering engine namely Unreal Engine 4. Its advantages are that it supports producing in batches; UV expansion of the model is not required; the material can be replaced; the information of each channel of the PBR material can be output, etc. The disadvantages are that if the model's UV is irregular, such as exceeding the [0, 1] boundary, then the display of the model will be wrong; the layout of the textures is not carried out according to the importance level, for example the picture and the solid color occupy the same area of the merged texture, then if the data is too much, the model will be blurry; processing speed is slow, for example, because of processing in the editor, it takes a lot of time to open the editor and import models and materials.

SUMMARY OF THE INVENTION

The embodiments of the present invention provide a three-dimensional model and material merging method, device, storage medium, and rendering method, which solve the problem of slow merging of model texture materials and optimize the efficiency of three-dimensional real-time rendering. The present invention mainly solves the problems of rendering CPU overload caused by large data storage after the model texture material is merged, and the problem of rendering stuck caused by a large number of drawcalls. The technical scheme of the present invention is as follows:

In the first aspect, a three-dimensional model and a method for merging materials are provided, and the method comprises:

Step 1 data collection: obtaining three-dimensional model files, material files and texture maps;

Step 2 layout of the texture map determination: determining the size of the texture map puzzle, the layout characteristics of the texture map in the texture map puzzle, and the format of the texture map puzzle;

Step 3 material de-duplication and texture map merging: after de-duplicating the material, the texture map of each channel is merged according to the determined texture layout to obtain the texture map puzzle of each channel;

Step 4 storage optimization: optimizing the storage size of the three-dimensional models and texture map puzzles of each channel, and then generate and store the configuration file.

In the second aspect, a three-dimensional model and material merging device is provided, which comprises:

a data acquisition module, which is used to acquire three-dimensional model files, material files and texture maps;

a map layout determination module, which is used to determine the layout of maps;

a material de-duplication module, which is used to de-duplicate materials;

a texture map merging module, which is used to merge the texture maps of each channel according to the determined map layout to obtain the texture map puzzle of each channel;

an optimization and configuration module, which is used to generate and store configuration files after optimizing the storage size of the three-dimensional model and texture map puzzles of each channel.

In the third aspect, a terminal is provided, which includes one or more processors and one or more memories, and at least one instruction is stored in one or more memories. At least one instruction is loaded and executed by one or more processors to implement the operations performed by the above-mentioned three-dimensional models and materials merging method.

In the fourth aspect, a computer-readable storage medium is provided, wherein at least one instruction is stored in the storage medium, and at least one instruction is loaded and executed by a processor to implement the operations performed by the three-dimensional model and material merging method described above.

In a fifth aspect, a rendering method is provided, and the rendering method comprises:

According to the three-dimensional models and materials merging method described above, the three-dimensional model and the material are merged to generate a configuration file;

Based on the configuration file, render the three-dimensional model.

The benefits of the present invention include:

i. The present invention optimizes the storage size of the three-dimensional model and the texture mapping puzzle of each channel by pre-setting the texture map layout mode, improves the three-dimensional model and material merging speed, and enables smooth AR display;

ii. The present invention reduces the amount of data storage and the amount of data loading of the rendering CPU, and improves the rendering efficiency by de-duplicating materials and optimizing storage processing.

BRIEF DESCRIPTION OF DRAWINGS

In order to explain the embodiments of the present invention or the technical solutions in the existing techniques more clearly, the following drawings that need to be used in the embodiments or the existing techniques will be briefly introduced. Obviously, the drawings in the following description are only some embodiments of the present invention. For ordinary technical personnel in the field, other drawings can be obtained based on these drawings without creative work.

DETAILED DESCRIPTION OF THE EMBODIMENTS

In order to make the purposes, technical solutions, and advantages of the present invention clearer, the following further describes the present invention in detail with reference to the drawings and embodiments. It should be understood that the specific embodiments described herein are only used to explain the present invention, and do not limit the protection scope of the present invention.

Figure 1:
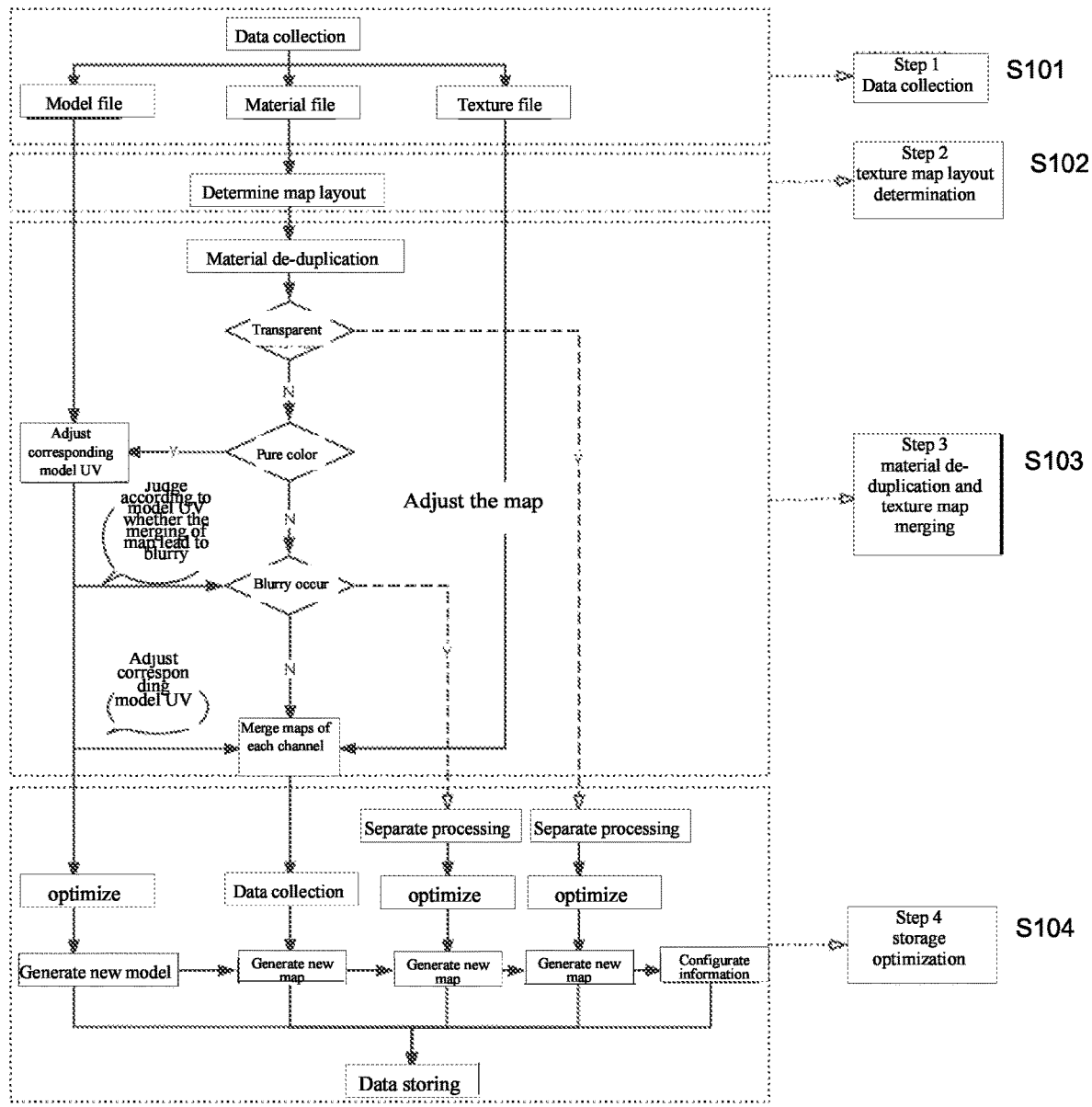
FIG. 1 is a flowchart of the three-dimensional model and material merging method provided by an embodiment of the present invention.

FIG. 1 is a flowchart of a method for merging three-dimensional models and materials according to an embodiment of the present invention. Referring to FIG. 1, take the merging of multiple three-dimensional models and materials in a rendering scene as an example for description. This embodiment comprises:

S101 (Step 1): obtaining three-dimensional model files, material files and texture maps.

Wherein, the three-dimensional model file contains multiple three-dimensional model data, and each three-dimensional model specifically represents a small product, so the size is relatively small. Each three-dimensional model data contains vertex information describing structural features, Normal information indicating the rendering direction, texture mapping information (UV information) of the model, and material ID identifying the rendering material. The material ID is used as a material identifier to associate the three-dimensional model rendering part with the material required for rendering, that is, according to the material ID, the texture map corresponding to the material can be baked to the corresponding three-dimensional model rendering part according to the model's UV information.

The material file contains material parameters. Different material types correspond to different material parameters. Each material parameter corresponds to a material parameter channel. Take the PBR material as an example. The material parameters include Base Color, Metallic, and Specular, Roughness, Emissive Color, Opacity, and Normal. Each material parameter is also a material channel, and different materials can be obtained by adjusting the values of different material channels. For example, emissive materials can be obtained by merely mixing the Emissive Color channel and the Opacity channel.

The texture map mainly provides texture information, which is presented in the form of a smaller size map.

The above-mentioned three-dimensional model can be obtained locally through three-dimensional modeling software modeling, and the software can be 3 ds max, Auto CAD, Maya and other software. In some embodiments, the three-dimensional model data sent from the terminal can also be received, and can also be downloaded from the cloud. The embodiments of the present invention limit the way of obtaining the three-dimensional model data. The above-mentioned material files and texture maps are all downloaded from the database.

S102 (Step 2): determining the texture layout.

In the embodiment, adopting bin pack algorithm to merge texture maps. When the bin pack method is different, that is, when the texture layout method is different, the texture map merging results are also different. In the practice, the texture map layout is determined according to the requirements. The layout includes the size of the texture map puzzle, the layout characteristics of the texture map in the texture map puzzle, and the format of the texture map puzzle.

In some embodiments, when the rendering scene quality requirement of the three-dimensional model is higher than the rendering fluency requirement, the rendering fluency is more concerned. For example, when the three-dimensional model is applied to the real-time rendering of an Augmented Reality (AR) scene, in order to enhance the real-time rendering, the process of the texture map puzzle can be limited to $2^N \times 2^N$, and the value of N can be 11.

In some embodiments, when the rendering scene quality requirement of the three-dimensional model is lower than the rendering fluency requirement, the quality of the rendering scene is more concerned. For example, when the three-dimensional model is applied to the rendering of a large scene. The large scene here refers to a merging of merged three-dimensional models. In order to improve the quality of the rendered scene, the texture map puzzle size can be limited to $2^N \times 2^N$, and the value of N can be 8 or 9.

The layout characteristics of the texture map in the texture map puzzle refer to the position of the texture map in the texture map puzzle, that is, set the position of the model's UV in the texture map puzzle. With the model's UV layout information, the texture map can be placed on the corresponding position according to the UV information of the model.

In some embodiments, there is a solid color material. At this time, in the texture mapping puzzle, the UV of the model corresponding to the solid color material is limited to the right and the bottom, and the UV of the model corresponding to other materials is arranged in the remaining position. According to the model's UV, the solid color map corresponding to the solid color material and other texture maps corresponding to other texture maps are arranged to the corresponding position. Here other texture maps refer to the texture maps remaining in the texture map set except for the solid color maps.

In some embodiments, when more attention is paid to material color, solid color maps and other texture maps can be arranged in two texture map puzzles respectively. The texture map puzzle format for arranging solid color maps is limited to .png, and the texture map puzzle format for arranging other texture maps is limited to .jpg. Compared with the format .jpg, the resolution of the format .png is higher, and the color of the solid color map is purer.

The format of the texture map puzzle refers to the storage format of the texture map puzzle. The user can specify the format of the texture map puzzle as .jpg or .png. For example, for the texture map puzzle corresponding to the Base Color channel, $P_{Base\ Color}$ for short, and the storage format is generally limited to .jpg. Of course, when more attention is paid to the color, the texture map puzzle corresponding to the Base Color channel includes $P_{Base\ Color1}$ and $P_{Base\ Color2}$, where $P_{Base\ Color1}$ is used to arrange solid color maps, and the limited format is .png. $P_{Base\ Color2}$ is used to arrange other texture maps, and the limited format is .jpg. For texture map puzzles corresponding to Metallic, Specular, Roughness, Emissive Color, Opacity and Normal channels, the storage form are all limited to .png.

S103 (Step 3): after de-duplicating the material, the texture map of each channel is merged according to the determined texture layout to obtain the texture map puzzle of each channel.

Since the three-dimensional model file contains multiple three-dimensional model data, each three-dimensional model corresponds to multiple materials. Among the materials corresponding to each three-dimensional model, or among the materials of a three-dimensional model, duplication exists. These repeated materials directly lead to the waste of the merged position of the corresponding texture map. Therefore, it is necessary to remove duplicate materials and update the material ID. Assuming that part A in three-dimensional model I adopts material a, then the ID of material a can be $I_a = \{I_A\}$; part B in three-dimensional model II adopts material a, and the ID of material a can be $II_a = \{II_B\}$. In this situation, material a is the repeated material. After removing the repeated material a, the ID of the material a is updated to $a = \{I_A, II_B\}$, which means that both the part A in the three-dimensional model I and the part B in the three-dimensional model II use the material a.

In the rendering process, the rendering of the transparent material is performed separately. Therefore, before the texture mapping of each channel is merged according to the determined map layout, the texture maps of each channel are not merged for transparent materials. Instead, directly optimize the storage size of the 3D model and texture map puzzle.

In some embodiments, when modeling is not performed in accordance with the standard, the UV value of the three-dimensional model will be much larger than [0,1]. In this case, the UV of the model will overlap when the texture map is merged. As a result, the rendering effect is blurred, so blur pre-judgment is required before the texture map is merged. Specifically, before merging the texture maps of each channel according to the determined texture map layout, according to the UV information of the three-dimensional model, determine whether the merging of the texture maps will cause a blurred rendering effect. The texture maps of the three-dimensional model whose merging will lead to blurry rendering effect are not merged.

In one embodiment, geometric cutting can be used to predict whether the merging of texture maps will lead to blurry rendering effects. Specifically, the geometry in the three-dimensional model is cut once by increasing the number of vertices. Calculate the number of vertices after cutting. When the number of vertices is greater than the threshold of the number of vertices, it is considered that the texture map merge will cause blurry rendering effect, thus the texture map of each channel will not be merged.

The vertex number threshold is set according to the required rendering image quality. When the required rendering image quality is higher, the vertex number threshold is smaller. For example, in a rendered image quality that is generally accepted by the public, the vertex value threshold can be set to 1.2K, where K is the number of vertices of the original three-dimensional model. When the number of vertices after geometric cutting is greater than 1.2K, it means that the merging of the texture maps will cause the rendering effect to be blurred. In this case, the texture map of each channel is not merged, instead, directly optimize the three-dimensional model and texture map puzzle storage size. Therefore, the embodiment of the present invention does not specifically limit the threshold of the number of vertices.

In one embodiment, when the texture map is multiplexed, causing the UV value to be much larger than [0,1], it means that multiple same texture maps are arranged in the layout area where only one texture map is allowed to be arranged. As a result, the resolution of each texture map is extremely reduced. When rendering, only one texture map needs to be called for rendering, which will directly affect the quality of the rendered image. In order to prevent this phenomenon, expanding the image can predict whether the merging of texture maps will cause blurry rendering effect. The specific process is:

Expanding the image in the layout area where only one texture map is allowed to be arranged, that is, increasing the number of texture maps in the layout area and change the UV value corresponding to the texture map. When the updated UV value is greater than the UV value threshold, it is considered that the merging of the texture map will lead to blurry rendering effect, and thus the texture map of each channel will not be merged.

The UV value threshold is set according to the required rendering image quality. When the required rendering image quality is higher, the UV value threshold is smaller. For example, in a rendered image quality that is generally accepted by the public, the UV value threshold can be set to [0,2]. When the updated UV value after the expansion of the image is less than [0,2], it is considered that the merging of the texture map will lead to blurry rendering effect, and thus the texture map of each channel will not be merged. Instead, directly optimize the storage size of the three-dimensional model and texture map puzzle. Therefore, the embodiment of the present invention does not specifically limit the UV value threshold.

Through fuzzy pre-judgment before merging texture maps, texture maps of three-dimensional models that will overlap after texture maps are merged are not merged, so as to avoid blurry rendered images after texture maps are merged.

After the texture map layout is determined, the texture maps of each channel can be merged according to the determined texture map layout to obtain the texture map puzzle of each channel. The specific process is:

For each channel, according to the determined texture map layout, that is, according to the UV information determined by the layout, the corresponding texture map is mapped to the UV, that is, the texture map is merged.

In some embodiments, in the process of merging texture maps, in order to support mip-map, padding is performed at the texture map splicing. At the same time, the UV of the corresponding model is also processed padding so as to avoid sampling errors. Specifically, reduce the original texture map by n pixels inward, and fill the released n pixel area with texture map boundary pixels. At the same time, reduce the UV of the corresponding model by n pixels inward. The value of n is generally 1 to 4.

Padding processing on the texture map splicing can prevent errors caused by sampling overflow when rendering sampling. Padding processing on the model's UV can ensure that the model's UV corresponds to the texture map and ensure the accuracy of rendering, thereby ensuring the quality of the rendered image.

Figures 2A, 2B, 2C, 2D, 2E:
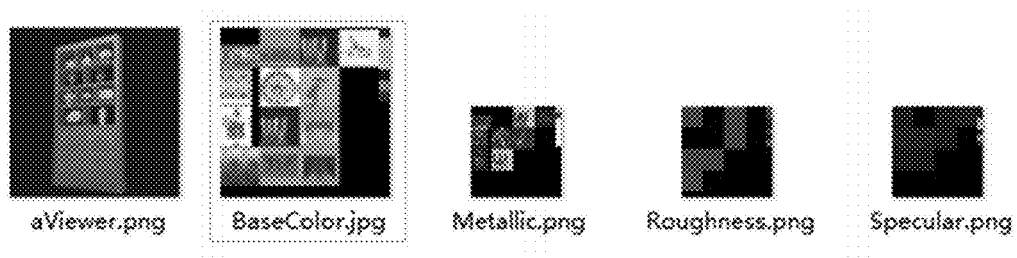
FIG. 2 (*a*) is the original scene map, and FIGS. 2 (*b*), 2(*c*), 2(*d*), 2 (*e*) are texture map puzzles of Base Color, Metallic, Roughness, and Specular channel respectively.

FIG. 2(a) is a scene view. After the texture mapping is merged using the above process, the texture mapping puzzles of Base Color, Metallic, Roughness, and Specular channels obtained are shown in 2(b)-(e) respectively.

S104 (Step 4): after optimizing the storage size of the three-dimensional model and the texture map puzzle of each channel, a configuration file is generated and stored.

On the basis of ensuring the quality of the rendered image, in order to reduce the amount of data loading during rendering and improve the smoothness of the rendering, it is necessary to optimize the size of the three-dimensional model and the texture map puzzle of each channel.

For the three-dimensional model, reduce the vertex data and Normal data of the three-dimensional model and the data accuracy of the UV data to optimize the storage size of the three-dimensional model. In some embodiments, three decimal places can be reserved for the vertex data and the Normal data. For the UV data, since the padding is performed to the UV in the above process, in order not to affect the result of the UV filling processing, the UV data can be reserved for five decimal places. Of course, the size of the data accuracy, that is, the number of decimals to be retained, is determined according to requirements, and the data accuracy is not specifically limited here.

Due to the difference of materials, different optimization strategies are adopted in the optimization of texture map puzzles.

In some embodiments, the rendering process of transparent materials is special compared with other materials and needs to be processed separately. Therefore, for transparent materials, the size of each channel texture map corresponding to the transparent material is directly optimized, that is, the size of each channel texture map is reduced.

In some embodiments, when there is no Normal map and Emissive Color channel information, texture map puzzles corresponding to the Normal channel and the Emissive Color channel are not generated.

In some embodiments, when the Metallic, Specular, and Roughness channels are solid color information, the texture map puzzles corresponding to the Metallic, Specular, and Roughness channels are directly optimized for size, that is, the texture map puzzle size is reduced, or the Metallic, Specular, and Roughness channels are merged into the R, G, and B channels of a picture, or the texture map puzzle format corresponding to the Metallic, Specular, and Roughness channels is converted from .png to .jpg format, so as to reduce the storage size of texture map puzzles.

In some embodiments, for the texture map of the three-dimensional model that will cause the rendering effect to be blurred after being merged, the corresponding texture map optimization process is selected according to the material to optimize the texture map.

After optimizing the storage size of the three-dimensional model and the texture map puzzle of each channel, the files of the new three-dimensional model after the optimization of the three-dimensional model storage size, and the optimized texture map (the texture map includes the texture map corresponding to the transparent material, the texture map that is not merged to avoid rendering blur, and the texture map in the texture map puzzle) are configurated and generated. The configuration file content includes the zoom ratio of UV, the position and size of the texture map after being merged, the padding size, etc., which is convenient for secondary processing, such as material replacement, etc.

When the rendering engine is rendering, each image loading takes up a network request. The increase in the number of network requests caused by the increase in the number of images not only affects the loading time of the model display, but also if one request fails or repeats, it will cause the loading to fail and reduce user experience. The embodiment of the present invention merges the texture maps of multiple three-dimensional models of a large scene into several texture map puzzles by merging three-dimensional models and materials, which reduces the network request occupied by the rendering engine to load pictures during rendering, thus improving the image loading rate and ensuring rendering efficiency.

At the same time, the embodiment of the present invention can reduce the number of models and texture maps and the number of rendering and drawing interfaces through the merging of three-dimensional models and materials, thereby making rendering smoother, improving rendering efficiency, and avoiding rendering stuttering.

As is well known, pictures were stored in the form of Bitmap in the video memory, and the video memory cost of dozens of pictures may be hundreds of megabytes. The embodiment of the present invention optimizes the storage size of the three-dimensional model and the texture map puzzle of each channel by merging the three-dimensional model and the material, so that the merged texture is reduced to more than ten megabytes or several megabytes, which greatly reduces the video memory overhead, improves the data transmission efficiency and rendering efficiency.

Figure 3:
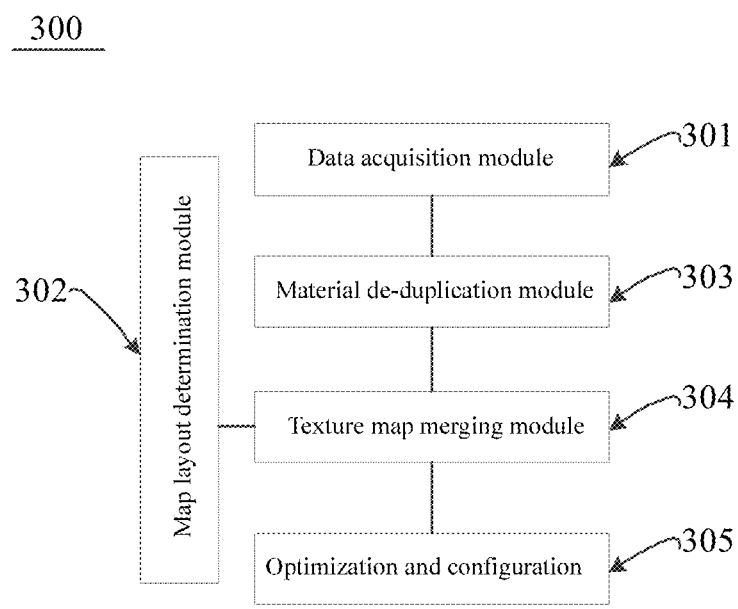
FIG. 3 is a schematic structural diagram of a three-dimensional model and material merging device provided by an embodiment of the present invention.

FIG. 3 is a flowchart of a three-dimensional model and material merging device provided by an embodiment of the present invention. Referring to FIG. 3, the merging of multiple three-dimensional models and materials in a rendering scene is taken as an example for description. The three-dimensional model and material merging device 300 includes:

Data acquisition module 301, which is used to acquire three-dimensional model files, material files, and texture maps;

Map layout determination module 302, which is used to determine the texture layout;

Material de-duplication module 303, which is used for de-duplication processing of materials;

Texture map merging module 304, which is used for merging and splicing the texture maps of each channel according to the determined texture map layout to obtain the texture map puzzle of each channel;

Optimization and configuration module 305, which is used to generate and store a configuration file after optimizing the storage size of a three-dimensional model and the texture map puzzle of each channel.

Figure 4:
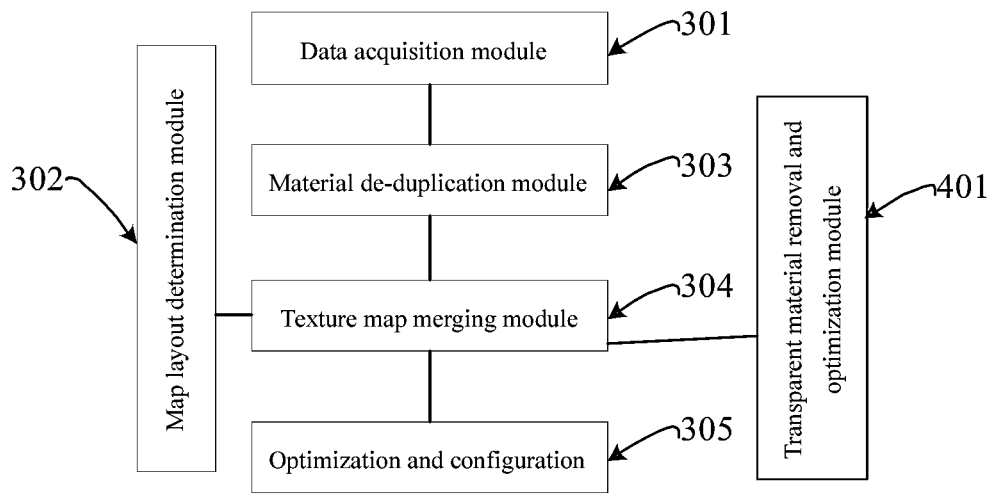
FIG. 4 is a schematic structural diagram of a three-dimensional model and material merging device provided by an embodiment of the present invention.

In one embodiment, as shown in FIG. 4, the three-dimensional model and material merging device 300 further includes:

Transparent material removal and optimization module 401, which is used to remove transparent materials before merging and splicing the texture maps of each channel according to the determined map layout. The transparent materials are not merged for the texture maps of each channel, instead, directly optimize the size of the texture maps of each channel corresponding to the transparent material. that is, reduce the texture map size of each channel.

Figure 5:
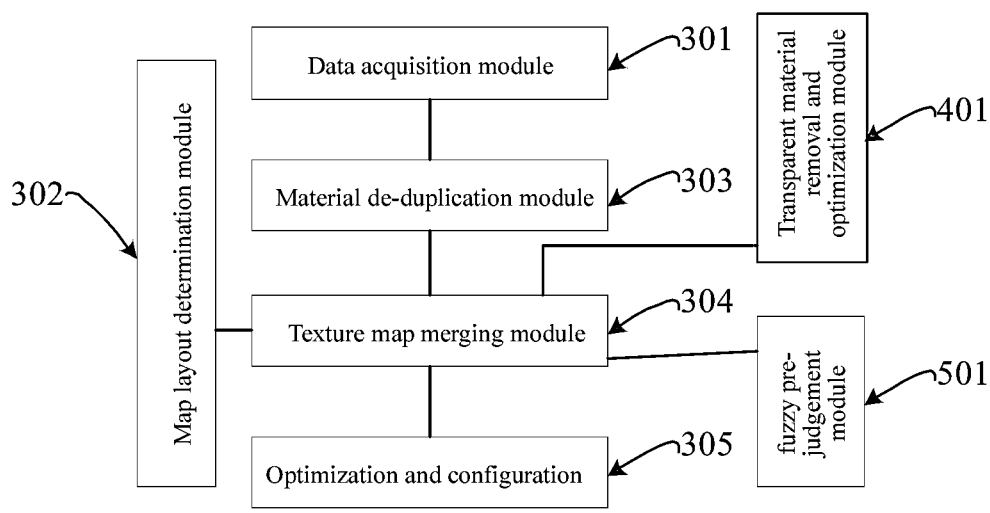
FIG. 5 is a schematic structural diagram of a three-dimensional model and material merging device provided by an embodiment of the present invention.

In an embodiment, as shown in FIG. 5, the three-dimensional model and material merging device 300 further includes:

Fuzzy pre-judgment module 501, which is used for judging whether the texture map merge will cause the rendering effect to be blurred according to the UV information of the three-dimensional model before the texture map of each channel is merged according to the determined texture map layout. The texture maps of the three-dimensional model whose merging will cause the rendering effect to be blurred are not merged.

The embodiment of the 3D model and material merging device merges the texture maps of multiple 3D models of a large scene into several texture map puzzles by merging the 3D model and the material, reducing the network request of the rendering engine to load the image during rendering, which improves the image loading rate and ensures rendering efficiency. At the same time, through the merging of three-dimensional models and materials, the number of models and texture maps can be reduced, and the number of rendering interfaces can be reduced, thereby making rendering smoother, improving rendering efficiency, and avoiding rendering stutters. In addition, through the merging of three-dimensional models and materials, combined with the optimization of the storage size of the three-dimensional model and texture map puzzles of each channel, the merged texture can be reduced to more than ten or several megabytes, which greatly reduces the memory overhead and improves the data transmission efficiency, which in turn improves rendering efficiency.

It should be noted that the three-dimensional model and material merging device provided in the above-mentioned embodiment only uses the division of the above-mentioned functional modules as examples when merging the three-dimensional model and material. In practical applications, the above-mentioned functions can be allocated by different functional modules according to the requirements. The three-dimensional model and material merging device provided in the foregoing embodiment belongs to the same concept as the three-dimensional model and material merging method embodiments. For the specific implementation process, please refer to the three-dimensional model and material merging method embodiments. It will not be repeated here.

Figure 6:
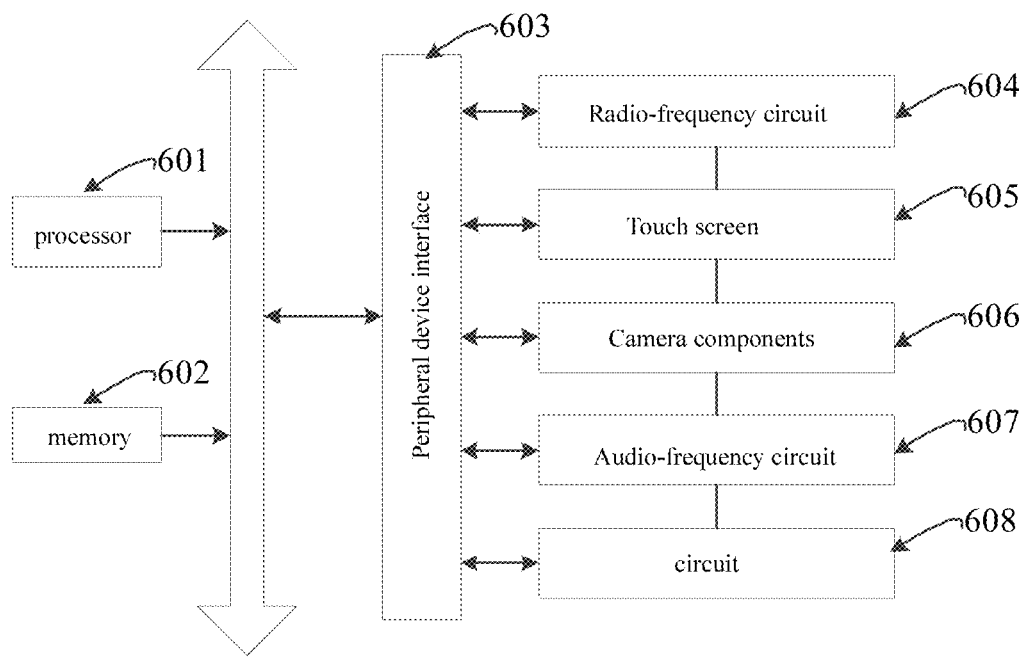
FIG. 6 is a schematic diagram of the structure of the terminal.

FIG. 6 is a schematic structural diagram of a terminal 600 provided by an embodiment of the present invention. Referring to FIG. 6, the terminal 600 may be a smart phone, a tablet computer, a notebook computer, or a desktop computer. The terminal 600 may also be called user equipment, portable terminal, laptop terminal, desktop terminal, and other names.

Generally, the terminal 600 includes a processor 601 and a memory 602. The memory 602 may include one or more computer-readable storage media, which may be non-transitory. The memory 602 may also include a high-speed random access memory and a non-volatile memory, such as one or more magnetic disk storage devices and flash memory storage devices. In some embodiments, the non-transitory computer-readable storage medium in the memory 602 is used to store at least one instruction, and at least one instruction is used to be executed by the processor 601 to implement the three-dimensional model and material merging method provided in the embodiment of the present invention.

In some embodiments, the terminal 600 may further include a peripheral device interface 603 and at least one peripheral device. The processor 601, the memory 602, and the peripheral device interface 603 may be connected by a bus or a signal line. Each peripheral device can be connected to the peripheral device interface 603 through a bus, a signal line, or a circuit board. Specifically, the peripheral device includes at least one of a radio-frequency circuit 604, a touch screen 605, a camera 606, an audio-frequency circuit 607, and a power supply 608.

The technical personnel in this field can understand that the structure shown in FIG. 6 does not constitute a limitation on the terminal 600, and may include more or fewer components than shown in the figure, or combine certain components, or adopt different component layouts.

In an exemplary embodiment, a computer-readable storage medium is also provided, such as a memory including at least one instruction, which can be executed by a processor in a terminal to complete the three-dimensional model and material merging method in the foregoing embodiment. For example, the computer-readable storage medium may be ROM, Random Access Memory (RAM), CD-ROM, magnetic tape, floppy disk, optical data storage device, etc.

The technical personnel in this field can understand that all or part of the steps in the foregoing embodiments can be implemented by hardware, or by a program instructing related hardware to be completed. The program can be stored in a computer-readable storage medium, as mentioned above. The storage medium can be read-only memory, magnetic disk or optical disk, etc.

Figure 7:
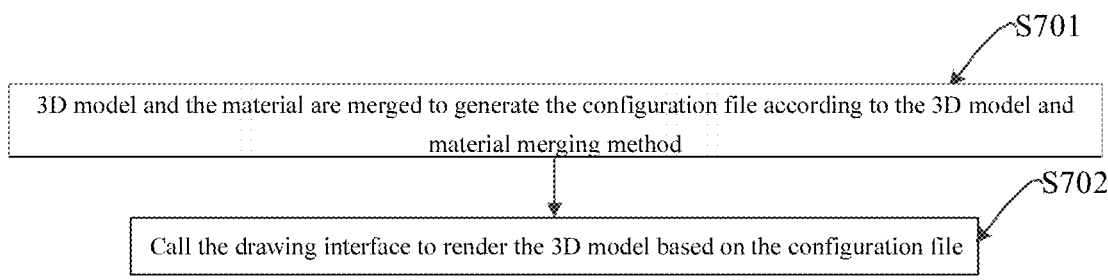
FIG. 7 is a flowchart of a rendering method provided by an embodiment of the present invention.

FIG. 7 is a flowchart of a rendering method provided by an embodiment of the present invention. Referring to FIG. 7, the rendering of a rendering scene is taken as an example for description. The rendering method includes:

S701, merging the three-dimensional model and the material according to the above-mentioned three-dimensional model and material merging method to generate a configuration file;

S702: Rendering the three-dimensional model based on the configuration file.

This rendering method uses the above-mentioned merging method to merge three-dimensional model and material, which reduces the network request to load images when the rendering engine renders, improves the image loading rate, ensures rendering efficiency, and reduces the rendering interface, which in turn, improves the rendering smoothness and efficiency, and avoids rendering stuttering.

The above rendering method can be applied to Apple AR display, IOS12'd new function, AR Quick Look, which can display three-dimensional models in real time, and can quickly switch to AR mode. Because this function supports all device that can be upgraded to IOS12, the display files usdz can be restricted to ensure normal operation. When processing models in batches, such as a bed, including beds, bedside tables, ornaments, quilts, etc., there are more than 70 meshes and more than 70 corresponding materials, and there are more than 40 textures. If the user does not do the merge processing, the usdz file generated will be very large, and it cannot be displayed normally due to display limitations. But after the three-dimensional model and material merging process of the present invention, it can be displayed smoothly during real-time rendering.

The above rendering method can be applied to an application in a large scene, loading a room, in which there will be a lot of material files for tables, chairs, benches, home appliances, and decorative lights. Each model corresponds to several or even dozens of texture files, and the final loading quantity will be very large. After successfully loading, each material or texture must be drawn separately and cannot be merged, which will also cause the final FPS to be very low. When the model and material texture of the entire scene reach four digits (very common), the stuttering phenomenon will directly lead to an unacceptable degree. However, after the three-dimensional model and material merging process of the present invention, the loading speed and FPS will be greatly improved.

Table 1 shows the results of some practical scene tests:

|  |  | Request Number | Size | Completion | Total texture | Texel size | drawcall number | Pure texture number | Repeater texture number |
|---|---|---|---|---|---|---|---|---|---|
| Test 1 | original | 525 | 28 Mb | 12.5 s | 206 | 35,087,629 | 552 | 17 | 8 |
|  | improved | 148 | 14.5 Mb | 5.5 s | 140 | 29,474,816 | 364 |  |  |
| Test 2 | original | 924 | 31.8 Mb | 17.7 s | 526 | 81,380,795 | 1017 | 31 | 29 |
|  | improved | 187 | 17 Mb | 6.7 s | 259 | 54,135,808 | 716 |  |  |
| Test 3 | original | 365 | 14.1 Mb | 7.5 s | 131 | 22,271,306 | 408 | 6 | 1 |
|  | improved | 117 | 10.3 Mb | 4.6 s | 112 | 17,950,720 | 338 |  |  |

According to Table 1, it is obvious that the three-dimensional model and material merging method and device provided by the present invention can greatly reduce the number of network requests used by the rendering engine to load pictures during rendering, reduce the number of rendering and drawing interfaces, and greatly reduce the memory overhead, which greatly improves rendering efficiency.

The specific implementations described above describe the technical solutions and benefits of the present invention in detail. It should be understood that the above descriptions are only the most preferred embodiments of the present invention and are not intended to limit the present invention. Any modifications, complements and equivalent replacements made within the scope shall be included in the protection scope of the present invention.

The invention claimed is:

1. A method for merging three-dimensional models and materials, characterized in that the method comprises:
   Step 1 data collection: obtaining three-dimensional model files, material files and texture maps, wherein each of the material files comprises a plurality of material parameters, and each of the plurality of material parameters comprises and corresponds to a channel;
   Step 2 layout of the texture map determination: determining the size of the texture map puzzle, the layout characteristics of the texture map in the texture map puzzle, and the format of the texture map puzzle;
   Step 3 material de-duplication and texture map merging: after de-duplicating the material, merging the texture map of each channel according to the determined texture layout to obtain the texture map puzzle of each channel; and
   Step 4 storage optimization: optimizing the storage size of the three-dimensional models and texture map puzzles of each channel, and then generate and store the configuration file.

2. The method of merging three-dimensional model and material of claim 1, wherein the method further comprises:
   before Step 2, removing the transparent material, but the texture map of each channel is not merged or spliced on the transparent material, and directly optimizing the size of the texture map of each channel corresponding to the transparent material, that is, scaling down the texture map of each channel.

3. The method of merging three-dimensional models and materials of claim 1, wherein the method further comprises:
   before Step 2, judging whether the rendering effect will be blurred after the texture map is merged according to the UV information of the three-dimensional model, and the texture maps of the three-dimensional model whose merging will lead to blurry rendering effects are not merged.

4. The method of merging three-dimensional models and materials of claim 3, wherein the method further comprises: predicting whether the merging of texture maps will lead to blurry rendering effects through geometric cutting; wherein the specific process comprises:
   cutting the geometry in the three-dimensional model once by increasing the number of vertices; calculating the number of vertices after cutting; when the number of vertices is greater than the threshold of the number of vertices, it is considered that the texture map merge will cause blurry rendering effect, thus the texture map of each channel will not be merged.

5. The method of merging three-dimensional models and materials of claim 3, wherein the method further comprises: predicting whether the merging of texture maps will lead to blurry rendering effects by expanding picture; wherein the specific process comprises:

expanding the image in the layout area where only one texture map is allowed to be arranged, that is, increasing the number of texture maps in the layout area, and changing the UV value corresponding to the texture map at the same time; when the updated UV value is greater than the UV value threshold, it is considered the merging of texture map will lead to blurry rendering effects, and the texture map of each channel will not be merged.

6. The method of merging three-dimensional models and materials of claim 1, wherein in the process of merging and splicing texture maps, filling processing is performed at the texture map splicing, and at the same time, the UV of the corresponding model is also filled.

7. The method of merging three-dimensional models and materials of claim 1, wherein optimizing the storage size of the three-dimensional model comprises:
reducing the data accuracy of the vertex data, Normal data and UV data of the three-dimensional model to optimize the storage size of the three-dimensional model.

8. The method of merging three-dimensional models and materials of claim 1, wherein optimizing the storage size of the texture map puzzle comprises:
when there is no Normal map and self-luminous color channel information, the texture map puzzle corresponding to the Normal channel and the self-luminous color channel is not generated.

9. The method of merging three-dimensional models and materials of claim 1, wherein optimizing the storage size of the texture map puzzle comprises:
when Metallic, Specular, and Roughness channels are pure color information, directly optimize the size of the texture map puzzles corresponding to the Metallic, Specular, and Roughness channels, that is, reduce the size of the texture map puzzle, or merge the Metallic, Specular, and the Roughness channel into R, G, and B channels of a picture, or convert the texture map puzzle format corresponding to the Metallic, Specular, and Roughness channels from .png to .jpg format to reduce the texture map puzzle storage size.

10. A device for merging three-dimensional models and materials, characterized in that the device comprises:
a data acquisition module, which is used to acquire three-dimensional model files, material files and texture maps, wherein each of the material files comprises a plurality of material parameters, and each of the plurality of material parameters comprises and corresponds to a channel;
a map layout determination module, which is used to determine the layout of maps;
a material de-duplication module, which is used to de-duplicate materials;
a texture map merging module, which is used to merge the texture maps of each channel according to the determined map layout to obtain the texture map puzzle of each channel;
an optimization and configuration module, which is used to generate and store configuration files after optimizing the storage size of the three-dimensional model and texture map puzzles of each channel.

11. The device for merging three-dimensional models and materials of claim 10, wherein the device further comprises:
a transparent material removal and optimization module, which is used to remove transparent materials before merging and splicing the texture maps of each channel according to the determined map layout; the merging of texture map of each channel is not performed on the transparent material, instead, directly optimizing the size of the texture, that is, the texture map size of each channel is reduced.

12. The device for merging three-dimensional models and materials of claim 10, wherein the device further comprises:
a fuzzy forecasting module, which is used to judge whether the merging of the texture maps will lead to blurry rendering effects according to the UV information of the three-dimensional model before the merging of texture maps of each channel according to the determined map layout; the texture maps of the three-dimensional model whose merging will lead to blurry rendering effects are not merged.

13. A terminal, wherein the terminal includes one or more processors and one or more memories, and instructions are stored in one or more memories; wherein the instructions are loaded and executed by one or more processors to implement the operations performed by the three-dimensional models and materials merging method according to claim 1.

14. A non-transitory computer-readable storage medium, wherein instructions are stored in the storage medium, and the instructions are loaded and executed by a processor to implement the operations performed by the three-dimensional model and material merging method described above according to claim 1.

15. A rendering method, wherein the rendering method comprises:
according to the three-dimensional models and materials merging method of claim 1, merging the three-dimensional model and the material to generate a configuration file;
based on the configuration file, rendering the three-dimensional model.

* * * * *